(12) United States Patent
Sommars et al.

(10) Patent No.: US 8,905,059 B2
(45) Date of Patent: Dec. 9, 2014

(54) DIESEL FUEL LEAKAGE CONTROL SYSTEM FOR A DUAL FUEL INJECTOR

(75) Inventors: Mark F. Sommars, Hopewell, IL (US); Hoisan Kim, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 116 days.

(21) Appl. No.: 13/553,962

(22) Filed: Jul. 20, 2012

(65) Prior Publication Data
US 2014/0020773 A1 Jan. 23, 2014

(51) Int. Cl.
*G05D 11/00* (2006.01)

(52) U.S. Cl.
USPC ......... 137/114; 123/526; 123/576; 239/585.1

(58) Field of Classification Search
CPC ... G05D 7/0133; G05D 7/0126; G05D 11/00; G05D 11/03
USPC .......... 123/525, 526, 575, 576, 577; 137/111, 137/114; 239/585.1, 585.4, 585.5
See application file for complete search history.

(56) References Cited

U.S. PATENT DOCUMENTS

| | | | |
|---|---|---|---|
| 4,699,103 A | 10/1987 | Tsukahara et al. | |
| 4,704,997 A | 11/1987 | Endo et al. | |
| 5,018,547 A * | 5/1991 | Alcorn | 137/111 |
| 5,275,189 A * | 1/1994 | Ensign | 137/3 |
| 5,771,857 A | 6/1998 | Willi | |
| 5,996,558 A | 12/1999 | Ouellette et al. | |
| 6,073,862 A | 6/2000 | Touchette et al. | |
| 6,085,726 A | 7/2000 | Lei et al. | |
| 6,298,833 B1 | 10/2001 | Douville et al. | |
| 6,336,598 B1 | 1/2002 | Touchette et al. | |
| 7,025,036 B2 | 4/2006 | Lampard | |
| 7,267,096 B2 | 9/2007 | Boecking | |
| 7,308,889 B2 | 12/2007 | Post et al. | |
| 7,428,893 B2 | 9/2008 | Shinogle et al. | |
| 7,438,238 B2 * | 10/2008 | Date et al. | 239/96 |
| 7,523,739 B2 * | 4/2009 | Kaneko | 123/381 |
| 7,891,579 B2 * | 2/2011 | Mashida et al. | 239/96 |
| 7,950,593 B2 | 5/2011 | Wang et al. | |
| 2010/0139636 A1* | 6/2010 | Atherley | 123/585 |
| 2011/0232601 A1 | 9/2011 | Kim | |

FOREIGN PATENT DOCUMENTS

| | | |
|---|---|---|
| EP | 0778410 B1 | 3/2000 |
| JP | 59141755 A | 8/1984 |

* cited by examiner

*Primary Examiner* — Stephen M Hepperle
*Assistant Examiner* — R. K. Arundale
(74) *Attorney, Agent, or Firm* — Miller, Matthias & Hull (57) ABSTRACT

A system for controlling leakage of diesel fuel into the natural gas side of a dual fuel injector during low pressure natural gas conditions comprises a leakage control valve that blocks the diesel fuel line during very low natural gas line pressure conditions, including start-up and limp-home mode conditions.

20 Claims, 6 Drawing Sheets

DIESEL FUEL LEAKAGE CONTROL SYSTEM FOR A DUAL FUEL INJECTOR

TECHNICAL FIELD

The present disclosure relates generally to dual fuel engines, and more particularly to a system for controlling leakage of diesel fuel into the natural gas side of a dual fuel injector.

BACKGROUND

In a diesel fuel internal combustion engine, air is introduced into each combustion chamber (cylinder) during an air intake stoke, then compressed during a compression stroke. The compression increases the air temperature so that when diesel fuel is introduced into the cylinder at the top of the compression stroke the diesel fuel vaporizes and ignites in a process called compression ignition. The ignited fuel undergoes rapid expansion, driving the piston downward during the power stroke. Exhaust gases are expelled during an exhaust stroke and the four-stroke diesel cycle begins again.

Diesel fuel engines enjoy high reliability, primarily due to the absence of the electrical ignition system required by their gasoline powered counterparts, and generally better fuel economy than gasoline powered engines. However, in recent years natural gas has become a desirable fuel source for internal combustion engines due to its lower cost and significantly lower emissions. Large diesel engines can be converted to run on natural gas with diesel fuel as a pilot (ignition) fuel. These "dual fuel" engines require onboard natural gas and diesel fuel (dual fuel) delivery systems.

The natural gas may be stored onboard in a pressurized temperature controlled tank as liquefied natural gas, or LNG. The natural gas is introduced by a dual fuel injector into the combustion chamber, where the natural gas is ignited by the separate injection of the diesel fuel by the same dual fuel injector.

In addition to serving as a pilot fuel, the diesel fuel may be used to lubricate the natural gas side of the dual fuel injector, particularly the natural gas upper guide and needle valve seat. This requires fluid communication between the diesel fuel line and the natural gas side of the injector. To minimize the migration of natural gas from the injector back into the diesel fuel line, a pressure differential is maintained between the natural gas side of the dual fuel injector and the diesel fuel line. A hydraulic seal serves to maintain this pressure differential during engine operation, with the pressure on the diesel fuel side exceeding the pressure on the natural gas side by about 5 megaPascals (MPa).

At engine start-up and in limp-home mode conditions, the natural gas line pressure can drop well below its normal operating pressure, even to zero. A low natural gas line pressure can result in an unacceptably high flow of diesel fuel into the natural gas side of the injector and back into the natural gas line.

The present disclosure is directed toward one or more of the problems set forth above.

SUMMARY

In one aspect of the disclosure, a system for controlling leakage of diesel fuel into a natural gas side of a dual fuel injector during low pressure natural gas conditions is provided. The system comprises a natural gas line having a natural gas line pressure, a diesel fuel line having a diesel fuel line pressure, and a leakage control valve in fluid connection with both the natural gas line and the diesel fuel line upstream of the dual fuel injector. The leakage control valve is movable between an open position in which diesel fuel can enter the dual fuel injector and a closed position in which diesel fuel is prevented from entering the dual fuel injector. The leakage control valve is responsive to the natural gas line pressure so that, when the natural gas line pressure equals or drops below a predetermined level, the leakage control valve closes, thereby preventing diesel fuel flow to the natural gas side of the dual fuel injector.

In another aspect, a leakage control valve for controlling the flow of diesel fuel from a diesel fuel line to the natural gas side of a dual fuel injector is provided. The leakage control valve is in fluid connection with a natural gas line having a natural gas line pressure and the diesel fuel line upstream of the dual fuel injector. The leakage control valve comprises a body, a valve member disposed within the body and moveable in reciprocating fashion between an open position in which diesel fuel can enter the dual fuel injector and a closed position in which diesel fuel is prevented from entering the dual fuel injector, and a spring disposed within the body that biases the leakage control valve in the closed position. The leakage control valve moves into the closed position whenever the natural gas line pressure equals or drops below a predetermined level.

In still another aspect, a method of preventing leakage of diesel fuel into a natural gas side of a dual fuel injector is provided. Diesel fuel is moved at a diesel fuel line pressure from a diesel fuel line through a leakage control valve to the natural gas side of the duel fuel injector. Natural gas is moved at a natural gas line pressure from a natural gas line through the leakage control valve to the natural gas side of a duel fuel injector. The natural gas line pressure is monitored. When the natural gas line pressure equals or drops below a predetermined level, the diesel fuel is prevented from flowing to the natural gas side of the dual fuel injector.

DETAILED DESCRIPTION

A system for preventing leakage of excess diesel fuel into the natural gas side of a dual fuel injection system is provided. The system employs a valve which opens and closes in response to the pressure from a natural gas line, closing a diesel fuel line when the pressure on the natural gas line drops below a predetermined level.

Figure 1:
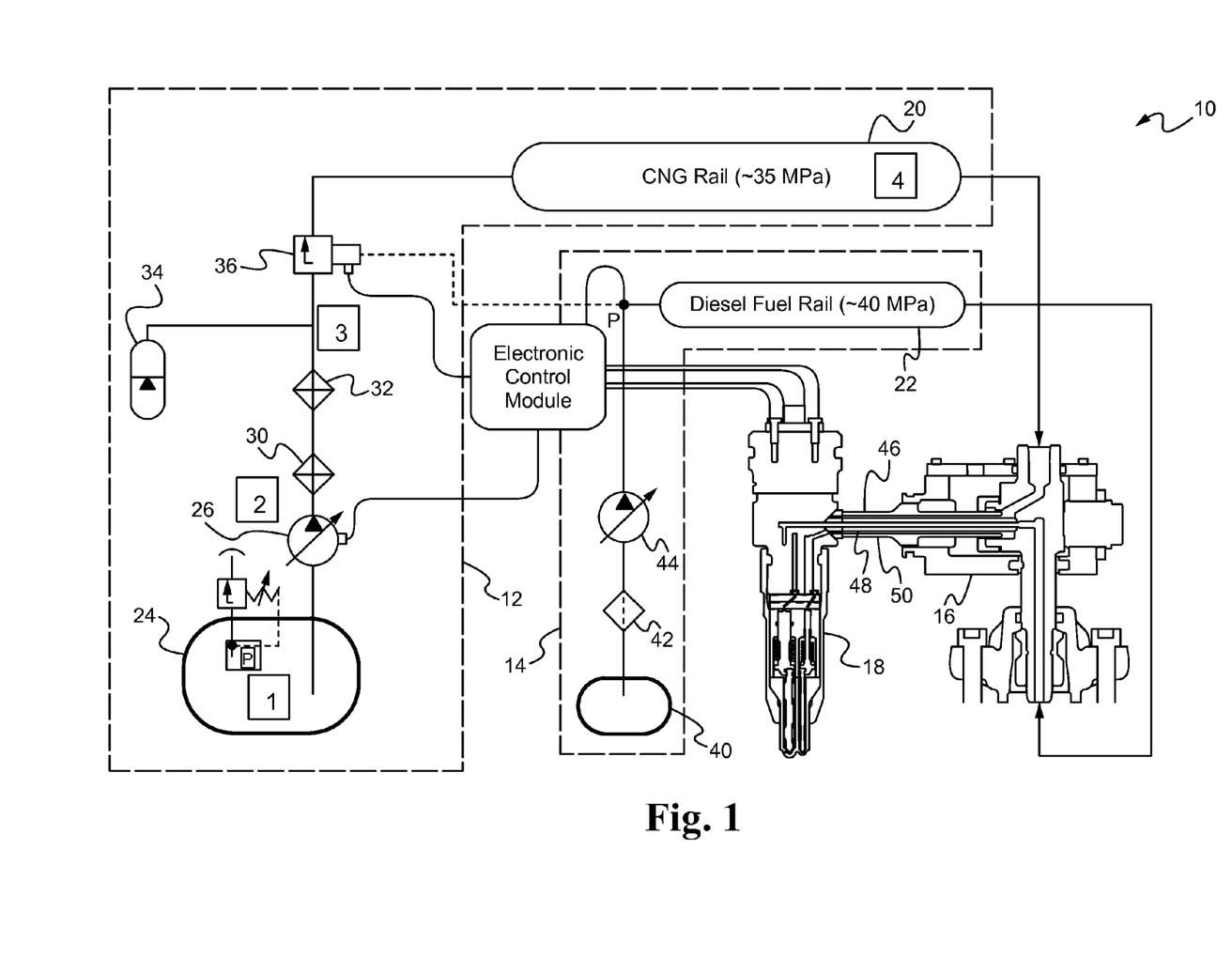
FIG. 1 is a schematic of a natural gas and diesel fuel delivery system for use with a dual fuel engine.

FIG. 1 is a schematic of a natural gas and diesel fuel delivery system 10 for use with a dual fuel engine. The illustrated system 10 comprises a natural gas delivery system denoted generally at 12, a diesel fuel delivery system denoted generally at 14 and multiple coaxial quill assemblies 16 in fluid communication with a corresponding number of dual fuel injectors 18. The natural gas delivery system 12 and the diesel fuel delivery system 14 deliver natural gas (NG) and diesel fuel respectively to the dual fuel injectors 18 via an NG rail 20 and a diesel fuel rail 22 respectively (as shown in FIG. 1).

The natural gas delivery system 12 comprises a cryogenic fuel tank 24 for holding a supply of liquefied natural gas (LNG) at low temperature, a cryogenic NG pump 26 operated by an electronic control module 28, a filter 30, a heat exchanger or evaporator 32, an accumulator 34, a pressure control module 36 for regulating the gas pressure before the NG reaches the injectors 18, and a compressed natural gas rail 20 for distributing the NG to the dual fuel injectors 18 via quill tubes 46.

The diesel fuel delivery system 14 comprises a diesel fuel tank 40, a fuel filter 42, a fuel pump 44 and a diesel fuel rail 22 for distributing the diesel fuel to the injectors 18 via quill tubes 48. The illustrated embodiment shows the diesel fuel and natural gas being delivered to each dual fuel injector 18 via a coaxial quill assembly 16 and a coaxial tube 50. However, it should be understood that the diesel fuel and natural gas quill tubes 46, 48 need not be coaxial, and that the natural gas and diesel fuel may enter the injectors 18 at different locations, such as the side and the top of the injectors 18 respectively.

As shown in FIG. 1 and as described in co-owned U.S. patent application Ser. No. 12/875,384 (U.S. Patent Publication No. U.S. 2012/0055448), incorporated herein by reference, NG from the NG delivery system 12 and diesel fuel from the diesel fuel delivery system 14 move through coaxial tubes 46 and into the injectors 18. Each coaxial tube 46 has an inner tube 48 and an outer tube 50, where the inner tube 48 delivers one fuel, such as diesel fuel, to an inner fuel inlet that communicates with the diesel fuel side of the injector 18, and an annular space between the inner tube 48 and the outer tube 50 that delivers a second fuel, such as natural gas, to an outer fuel inlet that communicates with the natural gas side of the injector 18.

Figure 2:
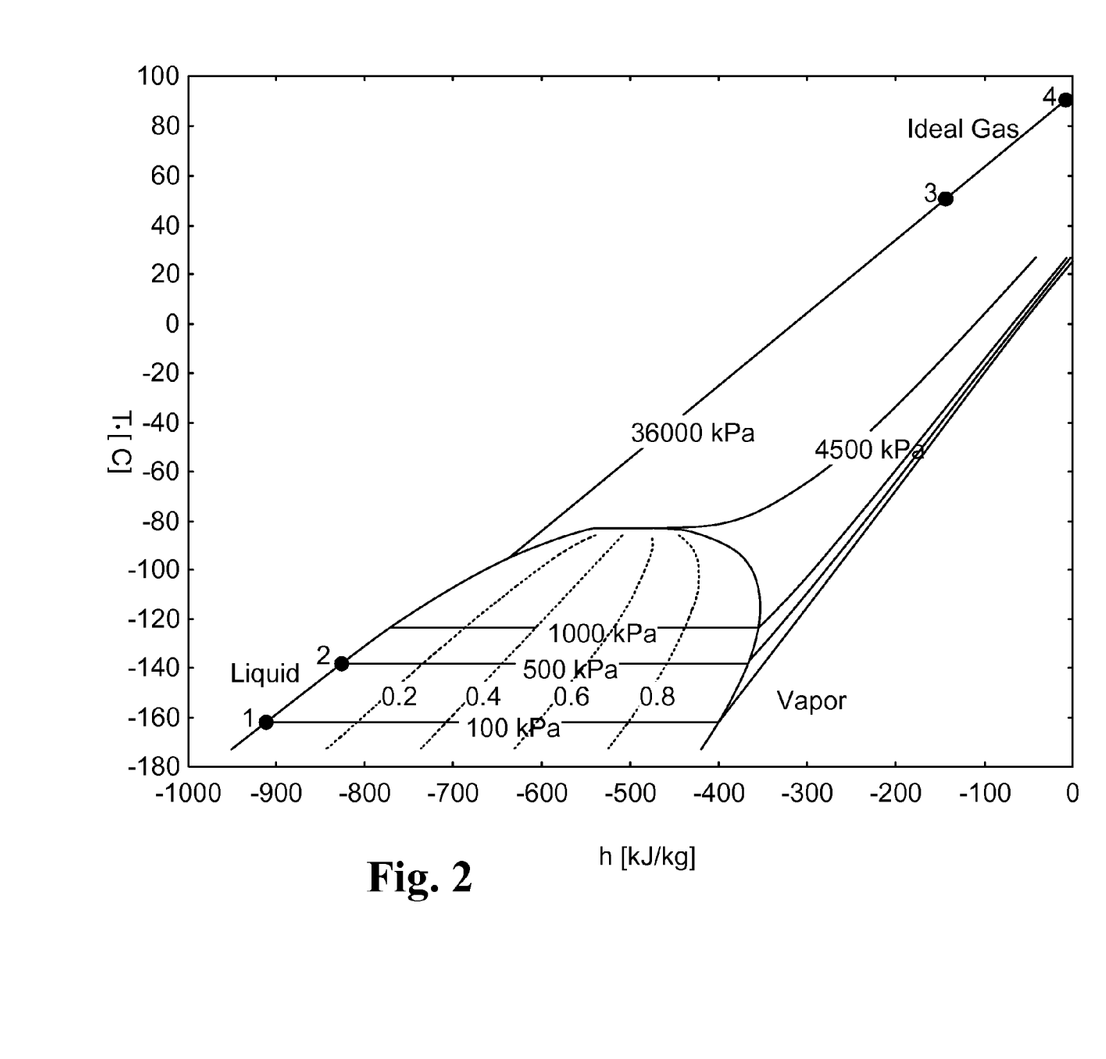
FIG. 2 is a phase diagram showing typical temperatures and pressures for natural gas at various stages along the natural gas delivery system.

FIG. 2 is a phase diagram for methane. The diagram presents an approximation of the phase changes that the natural gas goes through as it passes through the NG delivery system 14. The stages indicated by the numerals 1 to 4 correlate to the same stages in FIG. 1. The vertical axis (y-axis) indicates temperature (in degrees Centigrade) and the horizontal axis (x-axis) indicates entropy (in kiloJoules per kilogram, or kJ/kg). Pressure isobars are indicated at pressures of 100 kPa; 500 kPa; 1,000 kPa; 4,500 kPa and 36,000 kPa (36 MPa). As indicated at stage 1, LNG typically is kept in the cryogenic fuel tank 24 at a temperature of about −160 C and a pressure of about 100 kPa (about 14.5 psi). After passing through the pump 26, the temperature of the LNG is still only about −140 C but the pressure increases significantly to about 36 MPa (about 5,225 psi). The LNG is a supercritical fluid at this stage, indicated by the numeral 2. After passing through the evaporator 32 (indicated by stage 3 in FIGS. 1 and 2) the LNG becomes a gas with a relatively warm temperature of about 60 C (140 F) and a pressure still about 36 MPa. The temperature of the NG in the NG rail 20 (indicated by stage 4 in FIGS. 1 and 2) is about 9° C. and the pressure about 36 MPa. It should be understood that these natural gas temperature and pressure parameters are merely target operating parameters; the system is not limited to these parameters. For example, and without limitation, it is anticipated that the natural gas delivery system 12 could be operated at higher pressures.

In a dual fuel engine such as the one described herein, both natural gas and diesel fuel are injected directly into the combustion chambers (cylinders) at the beginning of the power stroke where they are mixed with air from an air intake manifold. A very small quantity of diesel fuel is used as a pilot (ignition) fuel to start the combustion process, which then ignites the natural gas. Only about 5% of the energy contained in the diesel fuel/natural gas mixture is provided by the diesel fuel, while the remaining 95% is provided by the natural gas. The initial burning of the diesel fuel is fairly local and occurs near the tip of the injector.

In a typical direct fuel injection system, an injector corresponding to each cylinder in the engine injects fuel through a small nozzle directly into the cylinder at the start of the combustion step. Each injector typically includes a needle valve that opens and closes in response to internal pressure within the injector to spray fuel through an opening in the injector nozzle into the cylinder.

In a single fuel common rail direct fuel injection engine, the fuel (such as gasoline or diesel fuel) is pumped into a common rail where it is stored at high pressure until it flows into the fuel injectors. In a double fuel common rail direct injection system like the kind described herein and shown in FIG. 1, one fuel (such as natural gas) is pumped by a cryogenic pump 26 into a common NG rail 20 where it is stored at high pressure until it flows into one side of the dual fuel injectors 18, while a second fuel (such as diesel fuel) is pumped by a diesel fuel pump 44 into a Diesel Fuel common rail 22 where it is stored until it flows into the other side of the dual fuel injectors 18. One side of each injector receives natural gas while the other side receives diesel fuel.

In both single fuel and double fuel systems, the flow of fuel from the common rail(s) into the injectors is initiated when the injectors are activated, that is, when the needle valves within the injectors are opened to allow the flow of fuel into the injectors (and into the combustion chambers). Prior to entering the fuel injectors 18 the two fuel lines may be brought together in a coaxial tube 50 arrangement as shown in FIG. 1. The coaxial tube 50 can run from the outside of the cylinder head (not shown in FIG. 1) into the injectors 18.

Figure 3:
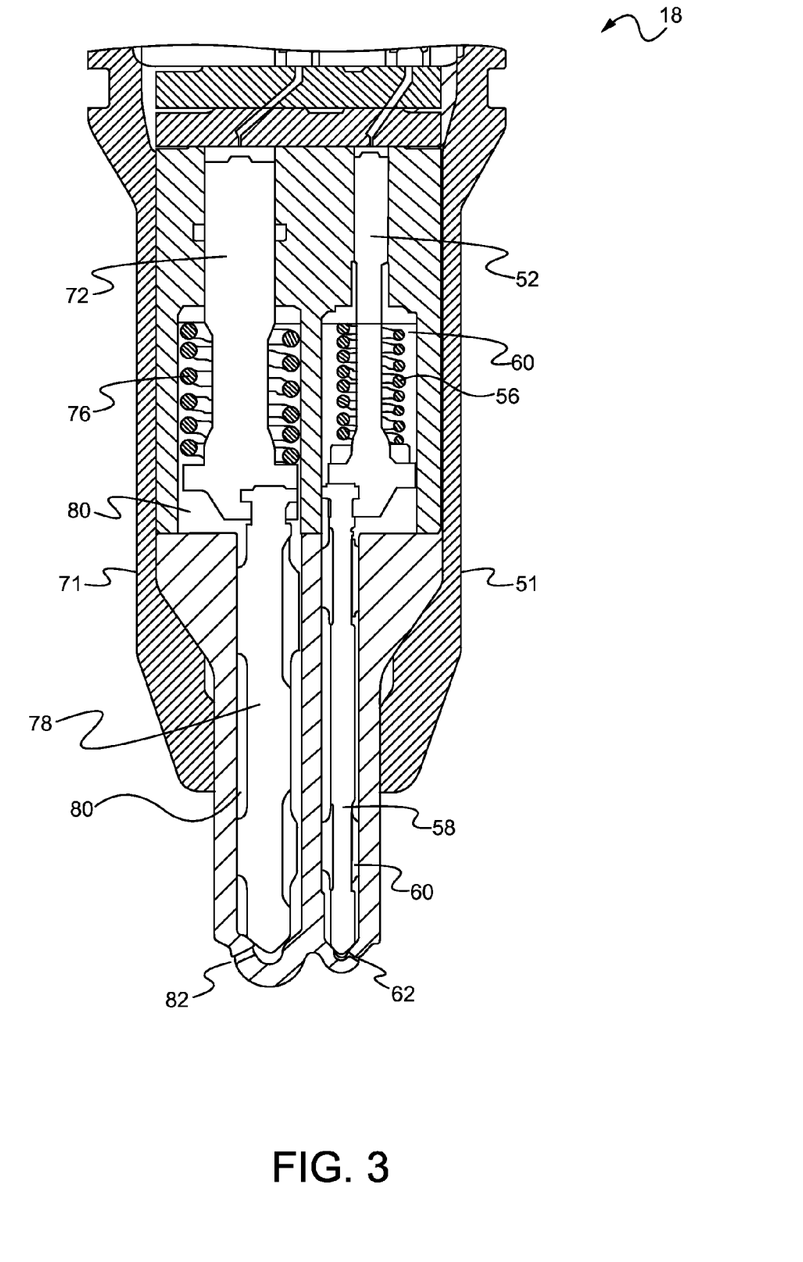
FIG. 3 is a cross sectional view of a dual fuel injector.

FIG. 3 is a cross sectional view of a dual fuel injector 18. The dual fuel injector 18 comprises a diesel fuel side 51 (shown on the right) and a natural gas side 71 (shown in the left). On the diesel fuel side 51, a diesel fuel upper guide 52 is operably connected to a diesel fuel needle valve 58 (aka diesel fuel check valve), with both the upper guide 52 and the needle valve 58 being located within a diesel fuel chamber 60. One or more diesel fuel orifices 62 located at the bottom of the diesel fuel chamber 60 communicate with the combustion chamber (not shown). The diesel fuel upper guide 52, and thus the diesel fuel needle valve 58, are biased in a closed position by a diesel fuel valve spring 56 positioned around the diesel fuel upper guide 52.

On the natural gas side 71, a natural gas upper guide 72 is operably connected to a natural gas needle valve 78 (aka natural gas check valve), and both are located within a natural gas chamber 80. One or more natural gas orifices 82 located at the bottom of the natural gas chamber 80 communicate with the combustion chamber (not shown). The natural gas upper guide 72, and thus the natural gas needle valve 78, are biased in a closed position by a natural gas valve spring 76 positioned around the natural gas upper guide 72.

Still referring to FIG. 3, the diesel fuel and natural gas upper guides 52, 72 may be controlled with solenoids located at the top of the dual fuel injector 18. Before fuel injection, the solenoids are deactivated and the diesel fuel upper guide 52 and the natural gas upper guide 72 are biased by their respective springs 56, 76 into their lowered positions, which helps cause the needle valves 58, 78 to seat against the interior of the injection tips, closing off the orifices 62, 82 located at the tips of the injector 18.

In one possible manner of operation, the diesel fuel solenoid is activated first, moving the diesel fuel upper guide 52 into the raised (open) position and allowing a small amount of diesel fuel to enter the combustion chamber. Then the diesel fuel solenoid is deactivated, causing the diesel fuel needle valve 58 to descend, closing the diesel fuel orifice(s) 62.

During or after the diesel fuel (pilot fuel) injection step, the natural gas solenoid is activated, moving the natural gas upper guide 72 and the natural gas needle valve 78 into the raised (open) position and allowing natural gas to enter the combustion chamber. Then the natural gas solenoid is deactivated, causing the natural gas needle valve 78 to descend, closing off the natural gas orifice(s) 82.

The diesel fuel and natural gas both enter the injector 18 through ports communicating with diesel fuel chamber 60 and natural gas chamber 80, then flow downward past the needle valves 58, 78 before exiting through the injection orifices 62, 82.

Figure 4:
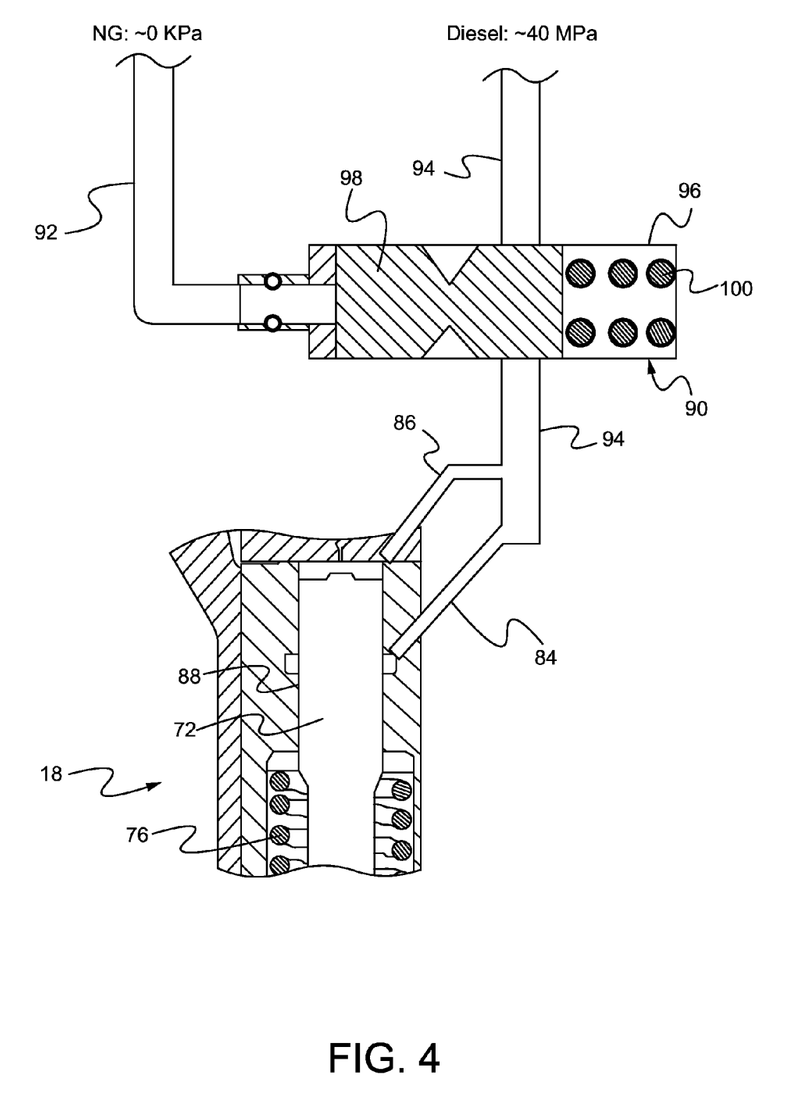
FIG. 4 is a schematic of a diesel fuel leakage control system shown in the closed position.
Figure 5:
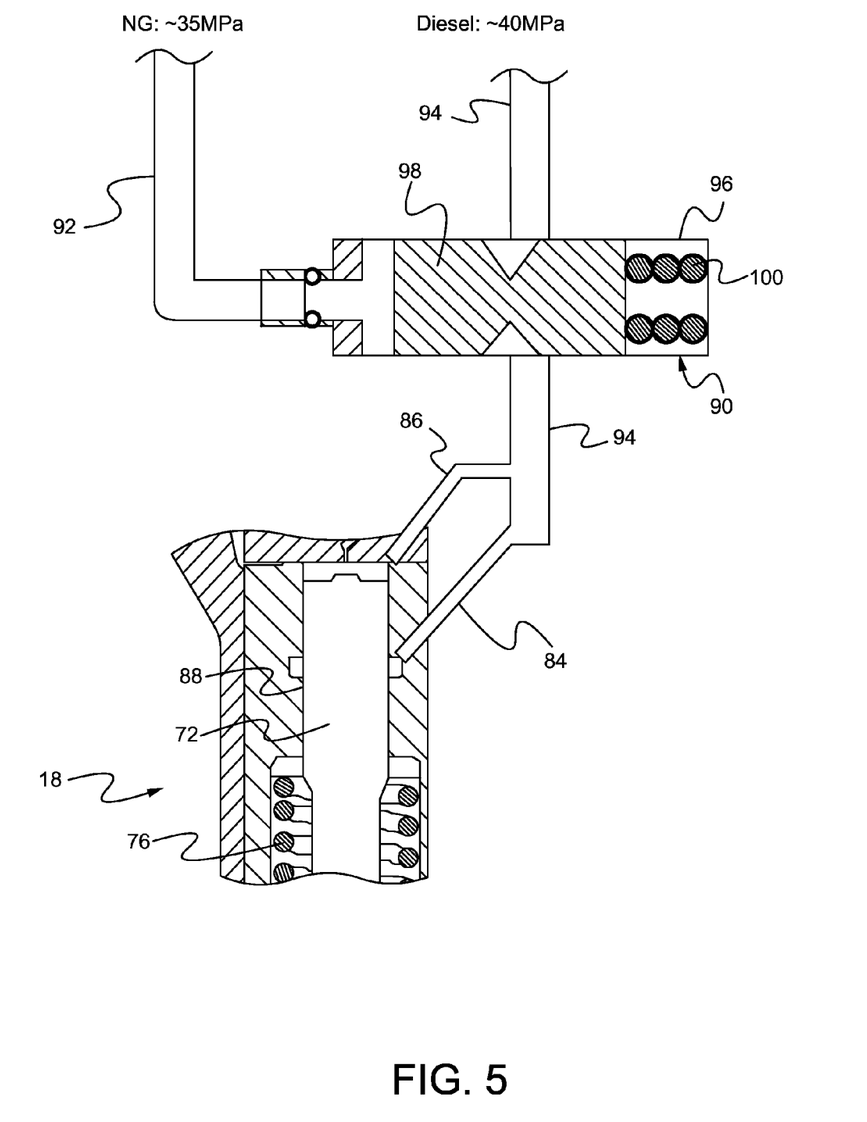
FIG. 5 is a schematic of a diesel fuel leakage control system shown in the open position.
Figure 6:
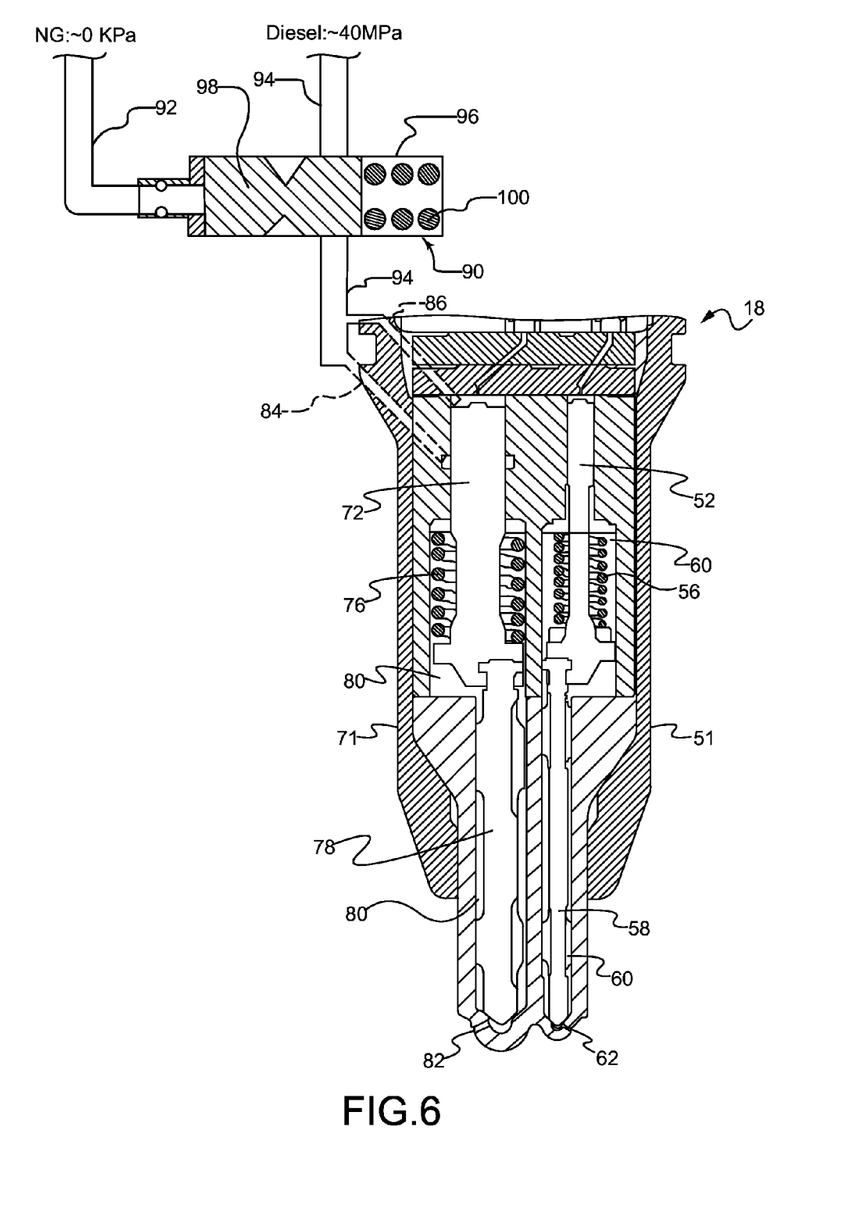
FIG. 6 is a combined schematic of the dual fuel injector of FIG. 3 and the diesel fuel leakage control system shown in the closed position of FIG. 4.

In addition to the diesel fuel side 51 of the dual fuel injector 18, diesel fuel also is introduced into the natural gas side 71 through a hydraulic seal 84 and a flow restriction, or Z, orifice 86 as shown in FIGS. 4 and 5. Both the hydraulic seal 84 and the Z orifice 86 provide fluid communication between the diesel fuel line and the natural gas chamber 80 of the injector 18.

The diesel fuel entering the natural gas side though the Z orifice 86 is necessary for the functioning of the natural gas upper guide 72. The diesel fuel entering the natural gas side though the hydraulic seal 84 ensures that there is a slight but continual flow of diesel fuel into the natural gas side of the injector 18 for sealing and lubrication purposes.

The diesel fuel entering the natural gas side through the hydraulic seal 84 enters the annular cavity 88 surrounding the natural gas upper guide 72, lubricating the upper guide 72 before flowing downward through the natural gas chamber 80. During operation, the diesel fuel line pressure is kept higher than the natural gas line pressure within the injector 18, typically about 5 MPa higher, to prevent natural gas from leaking from the injector 18 back into the diesel fuel line and accumulating in the diesel fuel tank 40 or, for that matter, leaking into the diesel fuel side of the injector 18. The diesel fuel line pressure minus the natural gas line pressure is referred to as the "pressure differential" across the leakage control valve 90.

In summary, the hydraulic seal 84 ensures that there is a slight but substantially continual flow of diesel fuel into the natural gas side 71 of the injector 18 for sealing and lubrication purposes. The amount of diesel fuel needed is a function of the diametrical clearance between the injector body and the natural gas upper guide 72 (typically about 4 microns on each side), and the pressure differential between the natural gas line and the diesel fuel line.

As long as the diesel fuel line pressure and natural gas line pressure are kept at their operative levels, with the diesel fuel line pressure exceeding the natural gas line pressure by about 5 MPa, the hydraulic seal 84 functions properly. But as the natural gas line pressure nears zero, instead of a 5 MPa pressure differential across the leakage control valve 90, the pressure differential can reach 40 MPa or higher. If this occurs, the natural gas side of the injector 18 can fill up with diesel fuel. Depending on how long the engine is operated in this condition, diesel fuel can begin filling up the natural gas line all the way back to the evaporator 32.

A number of things can cause the natural gas line pressure to drop to zero, including, most obviously, the vehicle running out of natural gas. Natural gas line pressure can also drop during start-up mode or limp home (diesel only) mode. To prevent the leakage of excess diesel fuel into the natural gas side of the injector 19 during a drop in natural gas line pressure, a diesel fuel leakage control system is provided.

FIGS. 4 and 5 are schematics of a diesel fuel leakage control system, including a leakage control valve 90 in fluid connection with both a natural gas line 92 and a diesel fuel line 94. The valve 90 is movable between a closed position (shown in FIG. 4), in which diesel fuel is prevented from entering the dual fuel injector 18 through the Z orifice 86 and hydraulic seal 84, and an open position (shown in FIG. 5), in which diesel fuel can enter the dual fuel injector 18 through the Z orifice 86 and hydraulic seal 84.

The valve may be any suitable valve, including a shuttle valve 90 such as that shown in FIG. 4. The shuttle valve 90 may comprise a body 96, a valve member 98 moveable in reciprocating fashion within the body 96, and a spring 100. The spring 100 biases the shuttle valve 90 in the diesel fuel blocking position unless its force is offset by the pressure in the natural gas line 92 as explained below.

The sliding valve member design shown in FIGS. 4 and 5 may include an annular space between the valve member 98 and the valve body 96, leaving open the possibility of diesel fuel leakage through the annular space and down into the natural gas side of the injector 18. Accordingly, in an alternative embodiment, the leakage control valve may be of the kind where a valve member seals against a seat, completely preventing the flow of diesel fuel across the leakage control valve.

Instead of the spring loaded valve 90 shown in FIGS. 4 and 5, the leakage control valve may also operate hydraulically or electronically in response to the relative pressures of the natural gas line 92 and diesel fuel line 94.

Whichever type of leakage control valve is used, the leakage control valve is designed to close off the relatively high pressure diesel fuel flow to the Z orifice 86 and to the hydraulic seal 84 during very low natural gas line pressure conditions (e.g., start-up and limp-home). For example, and with reference to FIGS. 4 and 5, when natural gas is unavailable and the gas pressure in the natural gas line 92 drops to zero or near zero, the spring 100 forces in the shuttle valve 90 overcome the natural gas line pressure, causing the shuttle valve 90 to move into the diesel fuel blocking position shown in FIG. 4. Diesel fuel is then prevented from entering the natural gas side of the injector 18 through the Z orifice 86 and the hydraulic seal 84. (Of course, when natural gas line pressure drops to zero, diesel fuel flow across the Z orifice 86 is unnecessary for opening the check valve because there's no natural gas being injected into the engine cylinders.)

When natural gas is available, the NG line pressure overcomes the spring forces, causing the shuttle valve 90 to move into the open position shown in FIG. 5. Diesel fuel can then enter the natural gas side of the injector 18 via the Z orifice 86 and the hydraulic seal 84.

While the pressure differential across the leakage control valve 90 has been stated as being preferably about 5 MPA, it should be understood the pressure differential is not limited to 5 MPa and may be as low as 1 MPa or less and as high as 20 MPa or more. Accordingly, the leakage control valve 90 may be set so that it closes when the pressure differential, i.e., the difference in pressure between the relatively higher pressure diesel fuel line 94 and the natural gas line 90, equals or exceeds a specified value, where the specified value may be any desired value, such as 20 MPA, 5 MPA or even 1 MPa.

Industrial Applicability

The diesel fuel leakage control system of the present disclosure finds applicability whenever the control of diesel fuel in a dual fuel system is desired. For example, the system may be used for controlling leakage of diesel fuel into the natural gas side of a dual fuel injector in internal combustion engines, including but not limited to engines which power mining trucks and other heavy duty machines. The system may be particularly useful during engine start-up and in limp-home mode conditions, when the natural gas line pressure can drop well below its normal operating pressure, even to zero, since a low natural gas line pressure can result in an unacceptably high flow of diesel fuel into the natural gas side of the injector and back into the natural gas line.

It should also be noted that the present disclosure is not limited to a natural gas engine using diesel fuel as the pilot fuel. Further, it should be understood that the embodiments described above are only particular examples which serve to illustrate the principles of the disclosure. Modifications and alternative embodiments of the disclosure are contemplated which do not depart from the scope of the disclosure as defined by the foregoing teachings and appended claims. It is intended that the claims cover all such modifications and alternative embodiments that fall within their scope.

What is claimed is:

1. A system for controlling leakage of diesel fuel into a natural gas side of a dual fuel injector during low pressure natural gas conditions, the dual fuel injector also having a diesel fuel side, the system comprising:
    a natural gas line having a natural gas line pressure, the natural gas line fluidly communicating with the natural gas side of the dual fuel injector;
    a diesel fuel line having a diesel fuel line pressure, the diesel fuel line fluidly communicating with the diesel fuel side of the dual fuel injector; and
    a leakage control valve having an inlet fluidly communicating with the diesel fuel line, an outlet fluidly communicating with natural gas side of the dual fuel injector, and a valve member fluidly communicating with the natural gas line;
    wherein the valve member is movable between an open position in which the inlet fluidly communicates with the outlet to permit diesel fuel flow to the natural gas side of the dual fuel injector, and a closed position preventing fluid communication from the inlet to the outlet to prevent diesel fuel from flowing to the natural gas side of the dual fuel injector, the valve member being responsive to the natural gas line pressure so that, when the natural gas line pressure equals or drops below a predetermined level, the valve member automatically moves to the closed position, thereby preventing diesel fuel flow to the natural gas side of the dual fuel injector.

2. The system of claim 1 wherein the predetermined level is zero.

3. The system of claim 1 wherein the predetermined level is a specified value less than the diesel fuel line pressure.

4. The system of claim 1 wherein the predetermined level is about 20 MPa less than the diesel fuel line pressure.

5. The system of claim 1 wherein the predetermined level is about 5 MPa less than the diesel fuel line pressure.

6. The system of claim 1 wherein the predetermined level is about 1 MPa less than the diesel fuel line pressure.

7. The system of claim 1 wherein the leakage control valve is a shuttle valve comprising a body sized to receive the valve member and a spring that biases the valve member in the closed position when the natural gas line pressure equals or drops below the predetermined level.

8. A leakage control valve for controlling the flow of diesel fuel from a diesel fuel line to the natural gas side of a dual fuel injector, the dual fuel injector also having a diesel fuel side, the leakage control valve being in fluid connection with a natural gas line having a natural gas line pressure and the diesel fuel line upstream of the dual fuel injector, the diesel fuel line having a diesel fuel line pressure, the leakage control valve comprising:
    a body defining an inlet fluidly communicating with the diesel fuel line and an outlet fluidly communicating with the natural gas side of the dual fuel injector;
    a valve member in fluid communication with the natural gas line and disposed within the body and moveable in reciprocating fashion between an open position in which the inlet fluidly communicates with the outlet to permit diesel fuel flow to the natural gas side of the dual fuel injector and a closed position preventing fluid communication from the inlet to the outlet to prevent diesel fuel from flowing to the natural gas side of the dual fuel injector; and
    a spring disposed within the body that biases the valve member in the closed position;
    wherein the valve member automatically moves to the closed position whenever the natural gas line pressure equals or drops below a predetermined level.

9. The leakage control valve of claim 8 wherein the predetermined level is zero.

10. The leakage control valve of claim 8 wherein the predetermined level is a specified value less than the diesel fuel line pressure.

11. The leakage control valve of claim 8 wherein the predetermined level is about 20 MPa less than the diesel fuel line pressure.

12. The leakage control valve of claim 8 wherein the predetermined level is about 5 MPa less than the diesel fuel line pressure.

13. The leakage control valve of claim 8 wherein the predetermined level is about 1 MPa less than the diesel fuel line pressure.

14. A method of preventing leakage of diesel fuel into a natural gas side of a dual fuel injector, the method comprising the steps of:
    moving diesel fuel at a diesel fuel line pressure from a diesel fuel line through a leakage control valve to the natural gas side of the duel fuel injector;
    moving natural gas at a natural gas line pressure from a natural gas line to the natural gas side of the duel fuel injector;
    monitoring the natural gas line pressure; and
    preventing the flow of diesel fuel from the diesel fuel line to the natural gas side of the dual fuel injector when the natural gas line pressure equals or drops below a predetermined level.

15. The method of claim 14 wherein the predetermined level is zero.

16. The method of claim 14 wherein the predetermined level is a specified value less than the diesel fuel line pressure.

17. The method of claim 14 wherein the predetermined level is about 20 MPa less than the diesel fuel line pressure.

18. The method of claim 14 wherein the predetermined level is about 5 MPa less than the diesel fuel line pressure.

19. The method of claim 14 wherein the predetermined level is about 1 MPa less than the diesel fuel line pressure.

20. The method of claim 14 further comprising the step of providing a leakage control valve in fluid connection with the natural gas line and the diesel fuel line upstream of the dual fuel injector, the leakage control valve comprising a body , a valve member disposed within the body and moveable in reciprocating fashion between an open position in which diesel fuel can enter the dual fuel injector and a closed position in which diesel fuel is prevented from entering the dual fuel injector, wherein the valve member moves into the closed position whenever the natural gas line pressure equals or drops below the predetermined level.

* * * * *

UNITED STATES PATENT AND TRADEMARK OFFICE
CERTIFICATE OF CORRECTION

| | |
|---|---|
| PATENT NO. | : 8,905,059 B2 |
| APPLICATION NO. | : 13/553962 |
| DATED | : December 9, 2014 |
| INVENTOR(S) | : Sommars et al. |

It is certified that error appears in the above-identified patent and that said Letters Patent is hereby corrected as shown below:

In the Specification:

Column 7, line 1, delete "Industrial Applicability" and insert -- INDUSTRIAL APPLICABILITY --.

Signed and Sealed this
Seventeenth Day of November, 2015

Michelle K. Lee
*Director of the United States Patent and Trademark Office*